April 21, 1925.                                              1,534,685
                       G. CLAUDE ET AL
PROCESS FOR SHAPING GLASS TUBES, MORE PARTICULARLY TUBES WITH RAREFIED
       GAS, INTENDED FOR LIGHTING OR LUMINOUS ADVERTISING
                      Filed Dec. 21, 1923

INVENTORS:
Georges Claude
and
Jean Marie Edouard de Beaufort
By
ATTORNEY

Patented Apr. 21, 1925.

1,534,685

UNITED STATES PATENT OFFICE.

GEORGES CLAUDE AND JEAN MARIE EDOUARD DE BEAUFORT, OF BOULOGNE-SUR-SEINE, FRANCE.

PROCESS FOR SHAPING GLASS TUBES, MORE PARTICULARLY TUBES WITH RAREFIED GAS, INTENDED FOR LIGHTING OR LUMINOUS ADVERTISING.

Application filed December 21, 1923. Serial No. 682,045.

*To all whom it may concern:*

Be it known that we, GEORGES CLAUDE, a citizen of the Republic of France, and a resident of Boulogne-sur-Seine, France, and JEAN MARIE EDOUARD DE BEAUFORT, citizen of the Republic of France, residing at Boulogne-sur-Seine, France, have invented certain new and useful improvements in a process for shaping glass tubes, more particularly tubes with rarefied gas, intended for lighting or luminous advertising, of which the following is a specification.

The process generally employed for giving the shape prescribed by drawings, to any glass tubes, more particularly those for rarefied gas such as neon and other gases used for lighting or luminous advertising, consists in heating the said tubes at a certain portion of their length in a suitable burner so as to soften the glass to a certain extent, and then bringing the softened portion in front of a pattern in order to give it the desired shape; the operations of heating and shaping the tube succeeding each other until the desired shape is completely obtained.

Such process consumes considerable time, owing to the successive operations which it necessitates; and it requires a certain skill on the part of the workman and also necessitates precautions in order to avoid breakage of the tubes. Moreover, the heating and the cooling of the tubes being irregular, their mechanical strength is necessarily reduced.

The present invention relates to a new process for shaping any glass tubes, which eliminates the drawbacks just mentioned.

This process substantially consists in constructing on the tube to be shaped a kind of cylindrical jacket by winding on the said tube, suitably close together coils of a wire which has an electric resistance and is capable of withstanding the temperature required for softening the glass, and which is electrically insulated by means of some incombustible material; in passing through the wire thus wound, a current of suitable strength which heats the glass and brings it to the desired degree of softening; then, in bending the whole—viz: the glass tube and its spiral jacket—on a template in order to give it the desired shape; and finally in cutting off the current from the wire and allowing the shaped tube to cool, which tube can be then stripped of its jacket.

This process makes it possible, as will be readily understood, on the one hand, to bring the tube very quickly and in a thoroughly uniform manner to the desired temperature, and the other hand, owing to its heat insulation produced by the same winding, to let it cool slowly, which is a necessary condition for subsequent good mechanical strength.

The carrying out of the process in practice will be better understood with reference to the accompanying drawing given by way of example, in which:—

Figure 1:
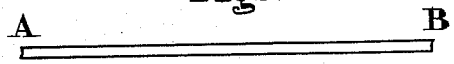
Fig. 1 is a view of the glass tube in its original, straight condition.
Figure 2:
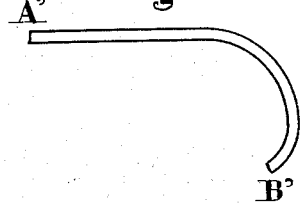
Fig. 2 shows the tube after it has been bent.
Figure 3:
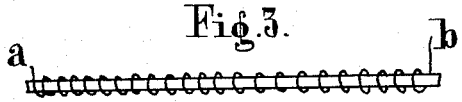
Fig. 3 shows the straight tube with its wire jacket.
Figure 4:
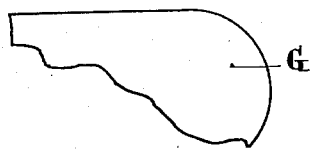
Fig. 4 is a fragmental view of the template.

The wire wound around the straight glass tube A B for the purpose hereinbefore specified, is marked $a\ b$ in Fig. 3. The tube A B and its jacket $a\ b$ are shaped into the curved form indicated at $A^1\ B^1$, in Fig. 2, when the tube A B is sufficiently softened by passing the heating current through the jacket $a\ b$, on the template G (Fig. 4).

It goes without saying that the process just described can be applied to the shaping of any glass tubes and generally of any glass articles they are to be shaped, whatever their purpose and whatever the shape to be given to them, the shaping being always effected in one operation.

We claim as our invention:

1. A process for shaping glass articles, consisting in forming a jacket around the article to be shaped by helically winding a wire with electric resistance capable of withstanding the temperature required for softening the glass and insulated electrically by means of an incombustible material; passing through the said winding a current of suitable strength for bringing the glass to the desired degree of softening; shaping on a template the unit constituted by the article and its winding so as to give the said unit the desired shape; then shutting off the current through the winding and allowing the shaped article, to cool slowly; and then stripping off the winding.

2. A process for shaping glass articles, comprising the successive steps of winding insulated wire around the article to be shaped; passing an electric current through said winding to soften the glass; shaping the softened article while the winding is in place thereon; shutting off the current; and removing the winding from the shaped article after the latter has cooled.

In testimony whereof we affix our signatures.

JEAN MARIE EDOUARD de BEAUFORT.
GEORGES CLAUDE.